(12) United States Patent
Willett

(10) Patent No.: US 6,895,648 B1
(45) Date of Patent: May 24, 2005

(54) MOTOR VEHICLE PNEUMATIC JACKLIFT SYSTEM

(76) Inventor: Michael J. Willett, 17288 Greasy Valley Rd., Cane Hill, AR (US) 72717

( * ) Notice: Subject to any disclaimer, the term of this patent is extended or adjusted under 35 U.S.C. 154(b) by 83 days.

(21) Appl. No.: 10/428,414

(22) Filed: May 3, 2003

(51) Int. Cl.$^7$ .............................. B23P 19/04; B66F 3/00
(52) U.S. Cl. ................................ 29/402.08; 29/402.03; 29/426.5; 29/252; 254/423; 254/93 H; 254/89 H; 254/93 VA
(58) Field of Search ........................ 29/402.01, 402.03, 29/402.08, 426.1, 426.5, 252; 254/418, 423, 254/93 H, 93 VA, 89 H, 45, 89; 152/415, 152/416; 280/763.1, 764.1, 762, 765.1, 766.1; 81/57.11; 173/93.5

(56) References Cited

U.S. PATENT DOCUMENTS

| | | | | |
|---|---|---|---|---|
| 1,153,223 A | * | 9/1915 | Hendrickson | 254/418 |
| 1,279,500 A | * | 9/1918 | Berry | 254/423 |
| 2,103,117 A | * | 12/1937 | Pearlman | 254/418 |
| 2,126,972 A | * | 8/1938 | Peters et al. | 254/418 |
| 2,168,906 A | * | 8/1939 | Leary | 254/423 |
| 2,237,167 A | * | 4/1941 | Skavinsky | 254/423 |
| 2,451,407 A | * | 10/1948 | Paolucci | 254/418 |
| 2,451,408 A | * | 10/1948 | Paolucei | 254/418 |

(Continued)

FOREIGN PATENT DOCUMENTS

CH 644802 A5 * 8/1984

(Continued)

Primary Examiner—Essama Omgba

(57) ABSTRACT

A permanently mounted pneumatic jack (jacklift) system for motor vehicles, as well as an impact wrench for removing and installing lug nuts. The system provides a quick and safe means of lifting one or more tires off the ground for replacement of a spare or rotating the tires on a motor vehicle. The present invention comprises two or more (typically four) pneumatic jacks, a system ON/OFF switch, an air compressor, a 120-psi air tank, air lines (hoses), individual jack extend/retract switches, jack position-locking pins, safety-locking pins, and impact wrench. Each jack can be locked in a horizontal stowaway or vertical operational position. The jack is cylindrical shaped with a telescopic body that can be extended or retracted as needed to raise and lower the vehicle. A solid cylindrical lift rod slides inside a cylindrical outer housing with a high-pressure seal means used to maintain pressure on the support rod. A ground support foot (plate) is mounted on the lower end of the solid cylindrical lift rod to provide sufficient traction with the ground to support the lifting process. A quick release air coupler is included on the pneumatic chamber to support the use of an air hose and impact wrench. An extend/retract toggle switch is included on each jack to control a solenoid valve to allow the air to flow into the jack. A quick release safety-locking pin is used to mechanically pin the solid cylindrical lift rod to the outer housing once the desired height is achieved to assure that the vehicle does not fall down in the event of a high-pressure air loss, thereby providing safety to the person(s) working around the vehicle. An air compressor located in the engine compartment of the vehicle is mechanically belt-driven off the engine. A high-pressure air line carries the air to a high-pressure (at least 120-psi) air tank located in the trunk or other suitable storage area on the vehicle. Separate air lines extend from the air tank to the individual jacks.

18 Claims, 4 Drawing Sheets

U.S. PATENT DOCUMENTS

| | | | | |
|---|---|---|---|---|
| 2,490,668 A | * | 12/1949 | Burgett | 254/418 |
| 2,570,334 A | * | 10/1951 | Erjavec | 254/418 |
| 2,646,250 A | * | 7/1953 | Fuster | 254/423 |
| 2,672,317 A | * | 3/1954 | Barenyi | 254/418 |
| 2,716,040 A | * | 8/1955 | Barenyi | 296/193.01 |
| 2,837,312 A | * | 6/1958 | Troche | 254/423 |
| 3,024,870 A | * | 3/1962 | Kramcsak, Jr. et al. | 254/418 |
| 3,033,523 A | * | 5/1962 | Mulholland et al. | 254/418 |
| 3,064,994 A | * | 11/1962 | Limmer | 280/6.15 |
| 3,166,298 A | * | 1/1965 | Di Stefano | 254/423 |
| 3,288,436 A | * | 11/1966 | Silva | 254/423 |
| 3,352,461 A | * | 11/1967 | Dascanio | 222/160 |
| 3,606,248 A | * | 9/1971 | Goldfarb | 254/423 |
| 3,614,064 A | * | 10/1971 | Bennett | 254/418 |
| 4,014,519 A | * | 3/1977 | Leigh | 254/423 |
| 4,150,813 A | * | 4/1979 | Mena | 254/423 |
| 4,605,086 A | * | 8/1986 | Marom | 180/202 |
| 4,993,688 A | * | 2/1991 | Mueller et al. | 254/423 |
| 5,143,386 A | * | 9/1992 | Uriarte | 254/418 |
| 5,217,209 A | * | 6/1993 | Anders | 254/419 |
| 5,219,429 A | * | 6/1993 | Shelton | 254/423 |
| 5,224,688 A | * | 7/1993 | Torres et al. | 254/23 |
| 5,232,206 A | * | 8/1993 | Hunt et al. | 254/423 |
| 5,377,957 A | * | 1/1995 | Mosley | 254/423 |
| 5,465,940 A | * | 11/1995 | Guzman et al. | 254/423 |
| 5,636,830 A | * | 6/1997 | Chartrand | 254/423 |
| 5,713,560 A | * | 2/1998 | Guarino | 254/423 |
| 5,722,641 A | * | 3/1998 | Martin et al. | 254/423 |
| 5,765,810 A | * | 6/1998 | Mattera | 254/423 |
| 5,876,526 A | * | 3/1999 | Hamade et al. | 152/416 |
| 5,931,500 A | * | 8/1999 | Dagnese | 280/766.1 |
| 6,079,742 A | * | 6/2000 | Spence | 280/766.1 |
| 6,224,040 B1 | * | 5/2001 | Mejias et al. | 254/423 |
| 6,237,953 B1 | * | 5/2001 | Farmer | 280/763.1 |
| 6,302,381 B1 | * | 10/2001 | Roll | 254/425 |
| 6,404,073 B1 | * | 6/2002 | Chiang | 307/10.1 |
| 6,439,545 B1 | * | 8/2002 | Hansen | 254/420 |
| 6,527,254 B1 | * | 3/2003 | Prevete | 254/423 |
| 6,832,402 B1 | * | 12/2004 | Drago et al. | 7/100 |
| 2002/0008231 A1 | * | 1/2002 | Glovatsky et al. | 254/418 |
| 2002/0100901 A1 | * | 8/2002 | Topelberg et al. | 254/423 |
| 2004/0155231 A1 | * | 8/2004 | Tsatsis | 254/423 |

FOREIGN PATENT DOCUMENTS

| | | | |
|---|---|---|---|
| DE | 3301923 A1 | * | 7/1984 |
| GB | 2244471 A | * | 12/1991 |
| GB | 22565177 A | * | 12/1992 |
| JP | 58183338 A | * | 10/1983 |

* cited by examiner

MOTOR VEHICLE PNEUMATIC JACKLIFT SYSTEM

BACKGROUND OF THE INVENTION

1. Field of the Invention

The present invention relates to a pneumatic jacklift system for use in connection with motor vehicles. The pneumatic jacklift system has particular utility in connection with changing a flat tire or rotating the tires on an automobile or truck.

2. Description of the Prior Art

Anyone who has ever changed a tire on an automobile or truck, especially on a busy street or highway, knows the danger and problems involved with getting portable jack to raise the vehicle off the ground and changing the tire. There is a need for a quicker and safer means of lifting a flat tire off the ground for replacement with a spare tire.

The use of pneumatic jack systems attached to motor vehicles is known in the prior art. For example, U.S. Pat. No. 4,993,688 to Mueller et al. discloses two built-in pneumatic power jacks, one mounted centrally to the front of the vehicle and the other mounted centrally to the rear of the vehicle for lifting the front or rear of a vehicle off the ground to change a tire. However, the Mueller '688 patent does not provide a means for swinging the jack up in a high-profile storage position above the ground when not in use, and has the further drawback of not addressing the safety issue of inadvertently dropping the vehicle in the event of loss of air pressure.

U.S. Pat. No. 5,465,940 to Guzman et al. discloses a pneumatic jack for lifting a tire off the ground for changing a flat. However, the Guzman '940 patent does not provide a means for swinging the jack up in a high-profile storage position above the ground when not in use, and although it has a safety mechanism for preventing unauthorized use of the jack, it has the further drawback of not addressing the safety issue of inadvertently dropping the vehicle in the event of loss of air pressure.

U.S. Pat. No. 5,232,206 to Hunt et al. discloses a compressed air elevator air jack used to lift a vehicle tire off the ground for changing a flat. However, the Hunt '206 patent does not provide a means for swinging the jack up in a high-profile storage position above the ground when not in use, and has the further drawback of not addressing the safety issue of inadvertently dropping the vehicle in the event of loss of air pressure.

Also, U.S. Pat. No. 5,765,810 to Mattera discloses a compressed air vehicle selective jacking system used for elevating a vehicle tire off the ground for changing a flat. However, the Mattera '810 patent does not provide a means for swinging the jack up in a high-profile storage position above the ground when not in use, and has the further drawback of not addressing the safety issue of inadvertently dropping the vehicle in the event of loss of air pressure.

Similarly, U.S. Pat. No. 6,079,742 to Spence discloses a hydraulic type tire changing system with frame mounted jacks and lug wrench. However, the Spence '742 patent does not provide a means for swinging the jack up in a high-profile storage position above the ground when not in use, and addresses the safety issue of inadvertently dropping the vehicle by means of separate pivotally mounted braces rather than by means of the safety locks installed directly on the jacks.

Lastly, U.S. Pat. No. 5,876,526 to Hamade et al. discloses apparatus that may be of general interest and pertinent to the construction and design of the present invention. The Hamade '526 patent discloses a system that uses a compressed air power impact wrench to actuate a scissors jack. However, the patent describes a system that is different in structure from the present invention and as with the above referenced patents does not provide a means for swinging the jack up in a high-profile storage position above the ground when not in use, and has the further drawback of not addressing the safety issue of inadvertently dropping the vehicle.

While the above-described devices fulfill their respective, particular objectives and requirements, the aforementioned patents do not describe a jacklift system that allows the jacks to swing into a high-profile out-of-the-way storage position when not in use and has built-in safety features to prevent the vehicle from inadvertently dropping the vehicle in the event of loss of air pressure. More particularly, although the Spence '742 patent addresses the safety problem of inadvertently dropping the vehicle in the event of jack failure, it does so by means of separately pivotal mounted braces rather than safety-locking pins directly on the jack.

Therefore, a need exists for a new and improved vehicle pneumatic jacklift system that can be used for changing or rotating tires on a motor vehicle. In this regard, the present invention substantially fulfills this need.—In this respect, the motor vehicle pneumatic jacklift system according to the present invention substantially departs from the conventional concepts and designs of the prior art, and in doing so provides an apparatus primarily developed for the purpose of quickly and safely lifting a flat tire off the ground for replacement with a spare tire.

SUMMARY OF THE INVENTION

In view of the foregoing disadvantages inherent in the known types of pneumatic lift systems for use with motor vehicles now present in the prior art, the present invention provides an improved motor vehicle pneumatic jacklift system, and overcomes the above-mentioned disadvantages and drawbacks of the prior art. As such, the general purpose of the present invention, which will be described subsequently in greater detail, is to provide a new and improved motor vehicle pneumatic jacklift system and method for safely changing a flat tire, which has all the advantages of the prior art mentioned heretofore and many novel features that result in a motor vehicle pneumatic jacklift system that is not anticipated, rendered obvious, suggested, or even implied by the prior art, either alone or in any combination thereof.

The system of the present invention involves a permanently mounted pneumatic jack (jacklift) system for motor vehicles, as well as an impact wrench for removing and installing lug nuts. The system provides a quick and safe means of lifting one or more tires off the ground for replacement with a spare tire or for rotating the tires. This system replaces the need for portable manual jack, which can be difficult to operate and is much more dangerous. The system also makes various other do-it-yourself tasks, such as brake service, oil change, and tire chain application much easier and safer to perform.

To attain this, the present invention essentially comprises two or more (typically four) pneumatic jacks, a system ON/OFF switch, an air compressor, a 120-psi air tank, air lines (hoses), individual jack extend/retract switches, jack position-locking pins, safety-locking pins, and an impact wrench. Typically four pneumatic jacks are mounted to the motor vehicle's lower frame, one just behind each front tire and one just in front of each rear tire. Each of the four pneumatic jacks is capable of pivoting at least 90-degrees from a horizontal storage state to a downward vertical operational state. In the raised horizontal storage state, the bottom end of the jack is secured to a special stowaway bracket, also mounted to the frame, with a quick release position-locking pin.

Each jack is cylindrical shaped with a telescopic body that can be extended or retracted as needed to raise and lower the vehicle. A solid cylindrical lift rod slides inside a cylindrical outer housing with a high-pressure seal means used to maintain air pressure on the solid cylindrical lift rod. A ground support foot (plate) is mounted on the lower end of the support rod to provide sufficient traction with the ground to support the lifting process. A quick release air coupler is included on the pneumatic chamber to support the use of an air hose and impact wrench. An extend/retract toggle switch is included on each jack to open and close a solenoid valve to allow the air to flow into the jack. A quick release position-locking pin is used to secure the jack in either the horizontal storage or vertical operational position. Additionally, a quick release safety-locking pin is used to mechanically pin the support rod to the outer housing once the desired height is achieved to assure that the vehicle does not fall down in the event of high-pressure air loss, thereby providing safety to the person(s) working around the vehicle. This safety-locking pin is inserted through the outer cylindrical housing and through one of a series of holes through the solid cylindrical lift rod.

An air compressor located in the engine compartment of the vehicle is mechanically belt-driven off the engine. A high-pressure air line carries the air to a high-pressure (at least 120-psi) air tank located in the trunk or other suitable storage area on the vehicle. Separate air lines extend from the air tank to the individual jacks. Solenoid valves are used to direct air to the desired jack as required.

Optionally, a regulator and pressure gauge can be added to one of the pneumatic jacks for supplying lower pressure air for applications such as bicycle tires, floating devices, balls, inflatable mattresses, etc.

In use, if a motorist needs to replace a flat tire, the system activation switch inside the car is turned ON. With the engine running, the compressor will provide compressed air to the storage tank. The jack at the flat tire is then released from the horizontal storage position and locked in the downward vertical position. The safety pin is then removed from the support rod allowing the support rod foot to come in contact with the ground. By pressing and holding the momentary toggle switch, compressed air is applied to the jack to extend the telescoping support rod and lift the tire off the ground to a desired height. The jack is then slightly further extended so the holes in the outer housing align with the next available hole through the solid cylindrical lift rod and the safety pin is installed. The jack is then slightly retracted allowing pressure on the safety pin, thereby providing a much safer working environment under and around the wheel. Optionally, all four jacks could be used to raise and secure the entire vehicle for rotating the tires.

An impact wrench can then be snapped on to the quick release coupler on the jack's pneumatic chamber and used to remove the lug nuts. Once the flat tire is replaced, the lug nuts are tightened using the impact wrench. The jack is then extended slightly to allow for removal of the safety pin and the jack is retracted allowing the tire back down on the ground. The solid cylindrical lift rod is placed in the fully retracted position and the safety pin is replaced, the position locking pin is removed, the jack is swung back into the horizontal storage position, and the position locking pin is reinstalled. Finally, the system is turned OFF allowing the air pressured in the storage tank to be dumped.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new motor vehicle pneumatic jacklift system that provides in the apparatuses and methods of the prior art some of the advantages thereof, while simultaneously overcoming some of the disadvantages normally associated therewith.

It is another object of the present invention to provide a new and improved after-market pneumatic jacklift system that may be easily retrofitted to existing motor vehicles.

It is another object of the present invention to provide a new and improved new motor vehicle pneumatic jacklift system that may be easily and efficiently manufactured and marketed.

An even further object of the present invention is to provide a new and improved motor vehicle pneumatic jacklift system that has a low cost of manufacture with regard to both materials and labor, and which accordingly is then susceptible of low prices of sale to the consuming public, thereby making such jacklift systems economically available to the buying public.

Lastly, it is an object of the present invention to provide a new and improved method for quickly and safely changing a flat tire or rotating the tires on a motor vehicle.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures with the exception that blocks in the block diagram are separately numbered.

DESCRIPTION OF THE PREFERRED EMBODIMENT

Figure 1:
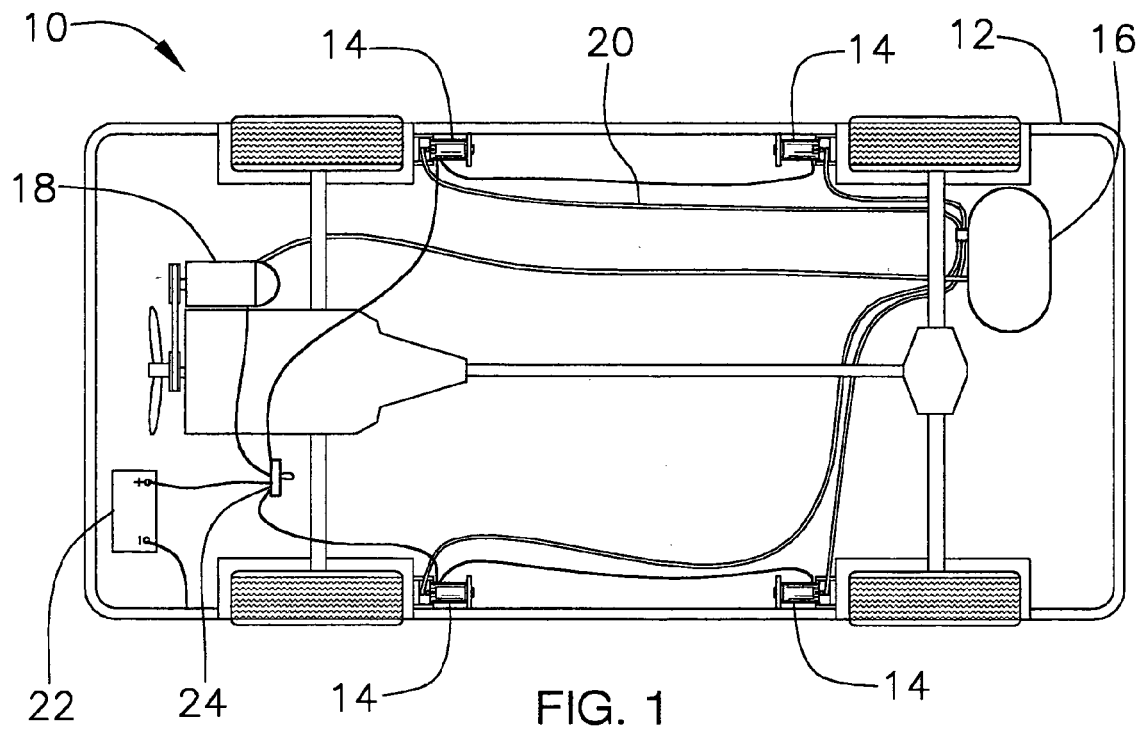
FIG. 1 is a bottom view of a motor vehicle showing the layout of the pneumatic jacklift system of the preferred embodiment of the present invention, with the jacks locked in an upward storage position.

Referring now to the drawings, and particularly to FIGS. 1–6, a preferred embodiment of the motor vehicle pneumatic airlift system of the present invention is shown and generally designated by the reference numeral 10.

In FIG. 1, a new and improved pneumatic airlift system 10 of the present invention for use in changing a flat tire on a motor vehicle is illustrated and will be described. More particularly, the pneumatic airlift system 10 is installed to the under frame of a motor vehicle 12. The system uses up to four jacklifts (jacks) 14, typically with two installed just behind the front tires and two just in front of the rear tires. A high-pressure air storage tank 16 is connected by an air hose or tubing to the output of an air compressor 18, which is mechanically belt-driven from the motor vehicle's engine. Additional air hoses 20 are used to deliver compressed air to the individual jacklifts. Also, a system activation switch 24, located inside the motor vehicle to prevent unauthorized use of the system, connects the vehicle's battery 22 to the system and is used to turn ON the system when needed.

Figure 2:
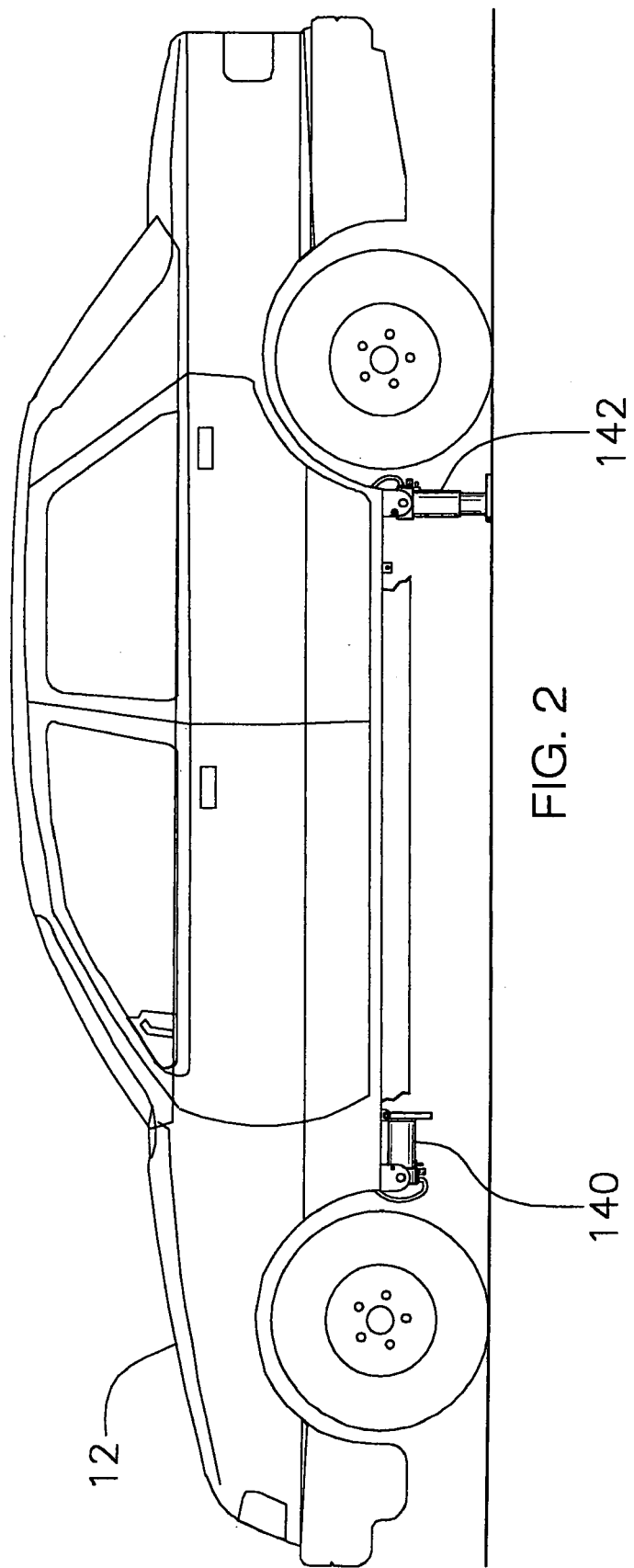
FIG. 2 is a side view of a motor vehicle equipped with the pneumatic jacklift system of the present invention.

FIG. 2 is a side view of a motor vehicle 12 equipped with the pneumatic jacklift system of the present invention. In this view, the front jacklift 140 is shown in the horizontal storage position and the rear jacklift 142 is shown in the downward vertical operational position.

Figure 3:
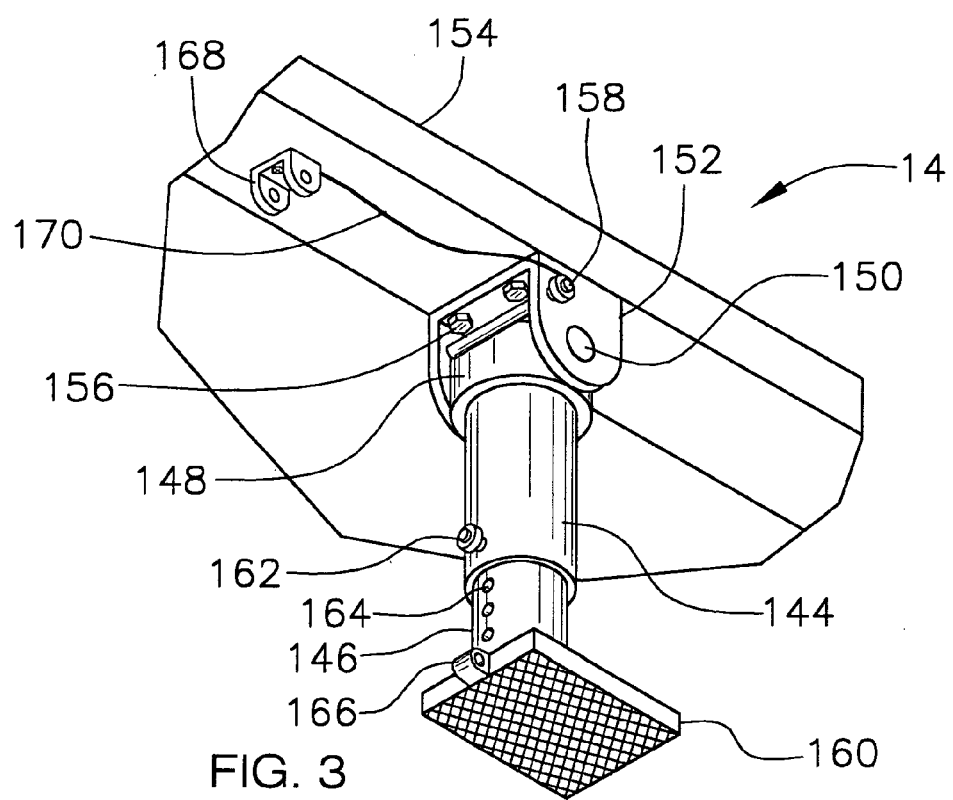
FIG. 3 is a perspective view showing one of the pneumatic airlift jacks of the present invention, with the jack secured in the downward operational position and locked in an extended state.
Figure 4:
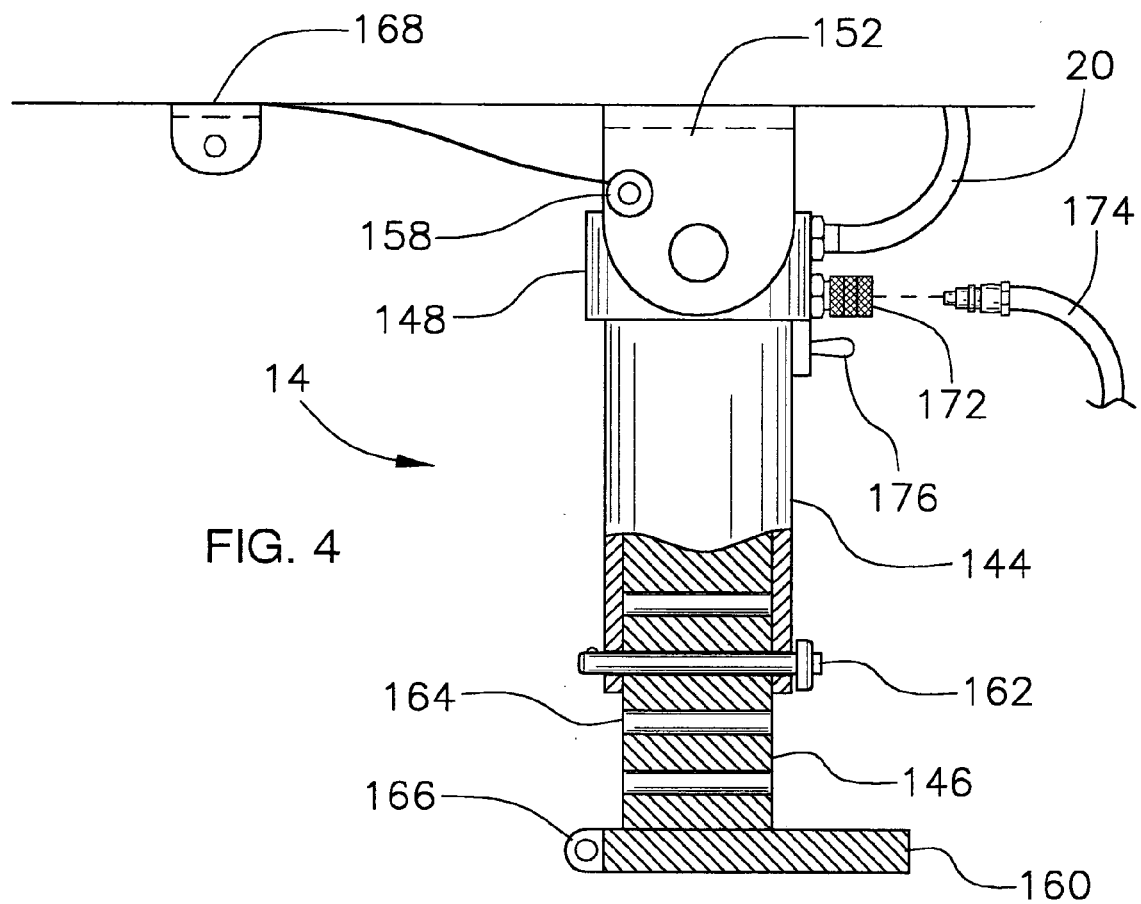
FIG. 4 is a side view of the jacklift of FIG. 3, shown in the downward operational position. This figure further shows an auxiliary air outlet.

FIGS. 3 and 4 show a perspective and side view, respectively, of the pneumatic airlift jacks 14 of the present invention, with the jack secured in the downward operational position and locked in an extended state. An outer cylindrical housing 144 is attached to the upper pneumatic chamber 148. A solid cylindrical lift rod 146 slides inside the outer cylindrical housing 144 through a high-pressure seal means to prevent the loss of compressed air. The solid cylindrical lift rod 146 has a series of through-holes 164 that can be made to align with a matching through-hole located near the bottom on each side of the outer cylindrical housing 144. A quick release safety-locking pin 162 can be installed through holes in the outer housing 144 and the solid cylindrical lift rod 146 to provide mechanical support of the jack in the event of loss of air pressure. A ground support foot 160 is mounted to the bottom end of the solid cylindrical lift rod 146 for contacting the ground while lifting a motor vehicle. The upper pneumatic chamber 148 is rotatively attached to a C-shaped mounting bracket 152, which is mounted to the under frame 154 of a motor vehicle by at least four bolts 156. A quick release position-locking pin 158 is inserted in through holes in the C-shaped mounting bracket 152 to secure the jacklift in a downward vertical position. For storage, this position-locking pin 158 is removed, allowing the entire jacklift to pivot upward by hinge means 150 approximately 90-degrees until a horizontal storage securing tab 166, built on to the ground support foot 160, aligns with the through-holes in an additional frame mounted stowaway bracket 168 and the position-locking pin 158 is reinstalled. The position-locking pin 158 is secured to the stowaway bracket 168 by means of a connecting chain 170 or wire to prevent loosing the pin. Additionally, an auxiliary air outlet quick release coupler 172 is included on the upper pneumatic chamber for connecting an auxiliary air hose 174 to the system for airing up a tire. A momentary toggle switch 176 is used to enable a solenoid means in the jacklift in order to apply compressed air to the jack.

Figure 5:
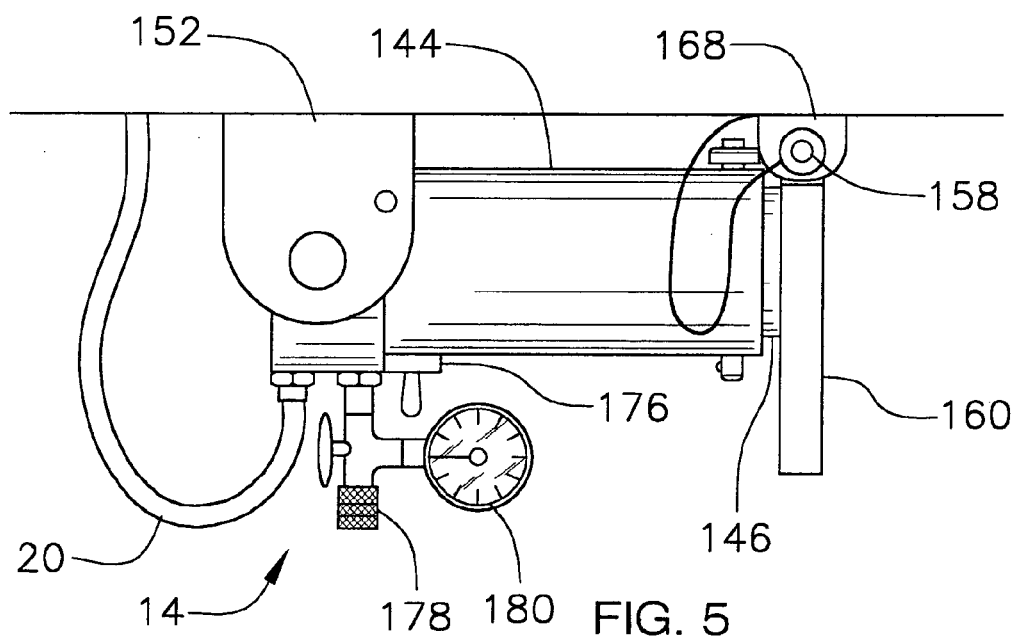
FIG. 5 is a side view of the jacklift of FIG. 3, shown in the horizontal storage position. This figure further shows an optional regulator valve and gauge for supplying lower pressure air for external applications.

FIG. 5 is a side view of the jacklift of FIG. 3, shown in the horizontal storage position. Here the quick release position locking pin 158 is installed through the horizontal stowaway bracket 168 and the horizontal storage securing tab 166 on the ground support foot. This figure further shows an optional regulator valve 178 and pressure gauge 180 for supplying lower pressure air for external applications, such as airing up a bicycle tire, floating device, balls, air mattresses, etc.

Figure 6:
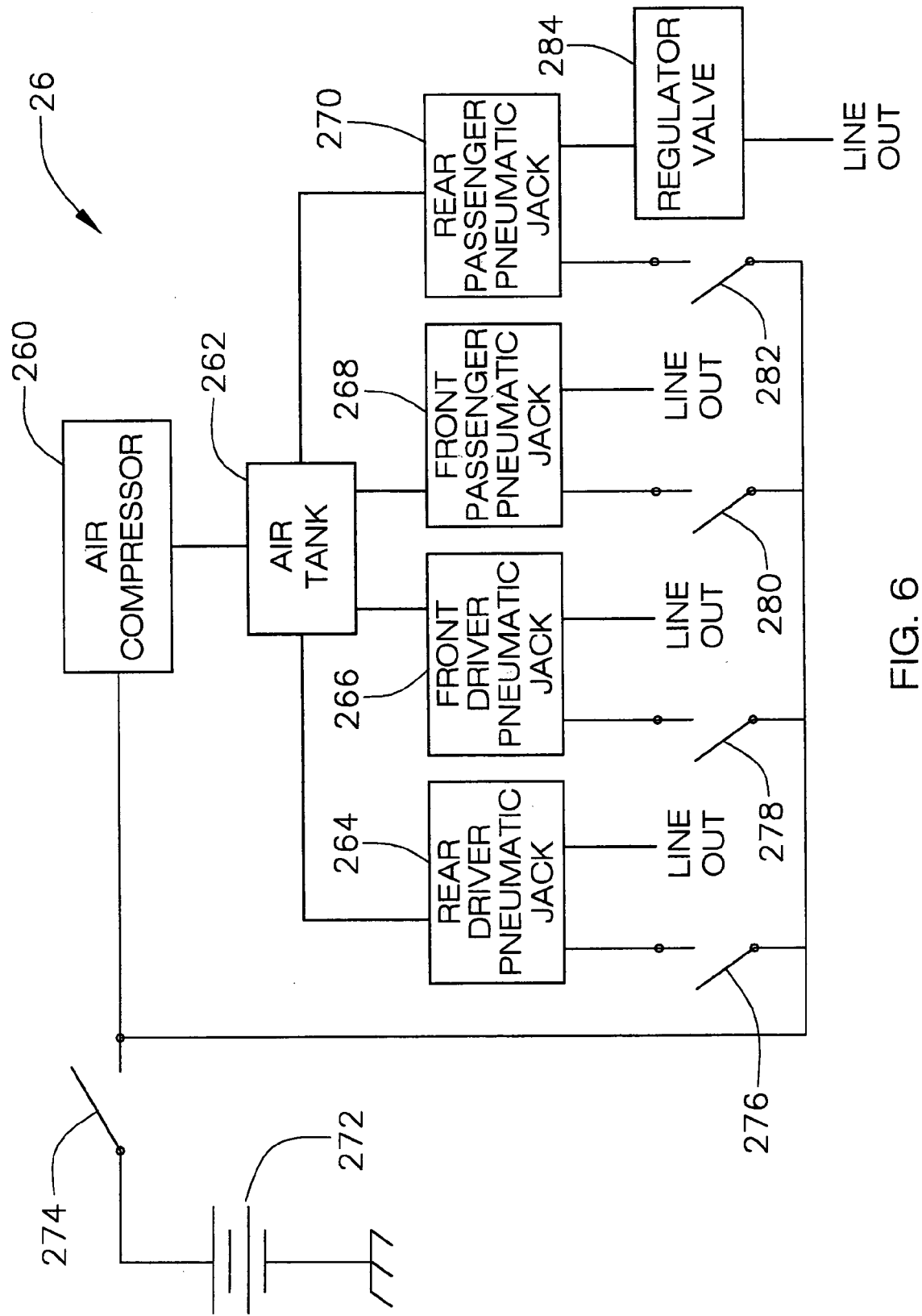
FIG. 6 is an electro-pneumatic block diagram for controlling the motor vehicle pneumatic airlift system of the present invention.

FIG. 6 is an electro-pneumatic block diagram 26 for controlling the motor vehicle pneumatic airlift system of the present invention. Here, the mechanically belt-driven air compressor 260 is enabled by supplying electrical power from the motor vehicle's battery 272 through the system activation switch 274. When activated, the air compressor supplies compressed air to a high-pressure (at least 120-psi) air storage tank 262. Air is further routed from the air storage tank to solenoids inside the four pneumatic jacks 264–270. Additional momentary toggle switches 276–282 are used to apply battery voltage to the rear driver jack 264, front driver jack 266, front passenger jack 268, and rear passenger jack 270, respectively, thereby allowing compressed air to extend the selected jacklift. Finally, a regulator valve 284 can be included on at least one of the jacks to supply lower pressure air for auxiliary applications.

In use, it can now be understood that if a motorist needs to replace a flat tire, the system activation switch inside the car is turned ON. With the engine running, the compressor will provide compressed air to the storage tank. The jack at the flat tire is then released from the horizontal storage position and locked in the downward vertical position. The safety pin is then removed from the solid cylindrical lift rod allowing the support rod foot to come in contact with the ground. By pressing and holding the momentary toggle switch on the jack, the jack is pressured with compressed air so as to extend the telescoping support rod and lift the tire off the ground to a desired height. The jack is then slightly further extended so the holes in the outer housing align with the next available hole through the solid cylindrical lift rod and the safety-lockimg pin is installed. The jack is then slightly retracted allowing pressure on the safety-locking pin, thereby providing a much safer working environment under and around the wheel. Optionally, all four jacks could be used to raise and secure the entire vehicle for rotating the tires.

An impact wrench can then be snapped on to the quick release coupler on the jack pneumatic chamber and used to remove the lug nuts. Once the flat tire is replaced, the lug nuts are tightened using the impact wrench. The jack is then extended slightly to allow for removal of the safety-locking pin and the jack is retracted allowing the tire back down on the ground. The solid cylindrical lift rod is placed in the fully retracted position and the safety-locking pin is replaced, the position-locking pin is removed, the jack is swung back into the horizontal storage position, and the position-locking pin is reinstalled. Finally, the system is turned OFF allowing the air pressured in the storage tank to be dumped.

While a preferred embodiment of the motor vehicle pneumatic jacklift system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, although the invention has been described primarily for use with an automobile, it can be adapted in size and operating capacity for use with SUVs, trucks, and other motor vehicles. Although it is generally assumed that the jacklifts will be fabricated from high-strength steel, other material candidates having the required strength parameters could be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pneumatic jack device for mounting permanently to the underside of a motor vehicle, comprising:
    an upper cylindrical high-pressure pneumatic chamber, said chamber having a high pressure air inlet for attaching an external air hose, said pneumatic chamber further having an electrically operated solenoid valve means for operating said jack device, said pneumatic chamber still further having a quick release air outlet fitting for attaching an auxiliary air hose;
    an outer cylindrical high-pressure housing extending downward from the bottom end of said pneumatic chamber, said outer housing having aligned through-holes on each side near the bottom of said housing for accepting a quick release safety-locking pin;
    a solid cylindrical lift rod slidably mounted inside said outer cylindrical housing, an interface between said outer cylindrical housing and said solid cylindrical lift rod being comprised of a high-pressure sealing means, said solid cylindrical lift rod having a series of equally spaced through-holes for accepting said quick release safety-locking pin;
    a momentary electrical switch for applying and releasing air pressure to said solenoid valve for raising said jack device;
    a solid support plate mounted to the bottom of said solid cylindrical lift rod for contacting the ground, said support plate further having a horizontal storage securing tab with a through-hole extending from one side for accepting a quick release position-locking pin;
    a C-shaped chassis mounting bracket mounted to the top end of said upper cylindrical pneumatic chamber by rotative attachment means, said bracket allowing said pneumatic jack device to be rotated at least 90-degrees to a near horizontal position for storage, said bracket having a through-hole for accepting a position-locking pin, said bracket further having at least four mounting holes in the top surface for mounting said jack device to a motor vehicle frame;
    a horizontal stowaway bracket for storing said jack device in an out of the way horizontal position, said stowaway bracket having a through-hole for accepting said position-locking pin, said stowaway bracket further having mounting holes in the top surface for mounting to said motor vehicle frame;
    said position-locking pin inserted through said through-hole in said C-shaped chassis mounting bracket to secure said jack device in a downward operational position for lifting said motor vehicle, said position-locking pin further being inserted through said through-hole in said horizontal stowaway bracket and said storage securing tab on said solid support plate for storing said jack device in a horizontal position, said position-locking pin further being attached to said stowaway bracket by means of a retaining chain to prevent losing said pin; and
    said quick release safety-locking pin inserted through said through-holes in said outer cylindrical housing and a desired hole in said solid cylindrical lift rod for securing said jack device for use or storage.

2. The device of claim 1, wherein said auxiliary air hose is connected to said quick release air outlet fitting of said pneumatic chamber for airing up a tire.

3. The device of claim 1, wherein an adjustable pressure regulator is connected to said air outlet fitting, said regulator having a quick release fitting for an auxiliary hose for use in low pressure applications.

4. The device of claim 3, wherein said pressure regulator is equipped with a pressure gauge for use in adjusting to a desired pressure.

5. The device of claim 1, wherein said ground support plate has a non-skid bottom surface for contacting the ground.

6. A pneumatic jacklift system in combination with a motor vehicle for lifting one or more vehicle tires off the ground, comprising:
    a motor vehicle;
    two or more pneumatic jack devices mounted to a lower frame of said motor vehicle, each said jack device further comprising:
        an upper cylindrical high-pressure pneumatic chamber, said chamber having a high pressure air inlet for attaching an external air hose, said pneumatic chamber further having an electrically operated solenoid valve means for operating said jack device, said pneumatic chamber still further having a quick release air outlet fitting for attaching an auxiliary air hose;

an outer cylindrical high-pressure housing extending downward from the bottom end of said pneumatic chamber, said outer housing having aligned through-holes on each side near the bottom of said housing for accepting a quick release safety-locking pin;

a solid cylindrical lift rod slidably mounted inside said outer cylindrical housing, an interface between said outer cylindrical housing and said solid cylindrical lift rod being comprised of a high-pressure sealing means, said solid cylindrical lift rod having a series of equally spaced through-holes for accepting said quick release safety-locking pin;

a momentary electrical switch for applying and releasing air pressure to said solenoid valve for raising said jack device;

a solid support plate mounted to the bottom of said solid cylindrical lift rod for contacting the ground, said support plate further having a horizontal storage securing tab with a through-hole extending from one side for accepting a quick release position-locking pin;

a C-shaped chassis mounting bracket mounted to the top end of said upper cylindrical pneumatic chamber by rotative attachment means, said bracket allowing said pneumatic jack device to be rotated at least 90-degrees to a near horizontal position for storage, said bracket having a through-hole for accepting a position-locking pin, said bracket further having at least four mounting holes in the top surface for mounting said jack device to a motor vehicle frame;

a horizontal stowaway bracket for storing said jack device in an out of the way horizontal position, said stowaway bracket having a through-hole for accepting said position-locking pin, said stowaway bracket further having mounting holes in the top surface for mounting to said motor vehicle frame;

said position-locking pin inserted through said through-hole in said C-shaped chassis mounting bracket to secure said jack device in a downward operational position for lifting said motor vehicle, said position-locking pin further being inserted through said through-hole in said horizontal stowaway bracket and said storage securing tab on said solid support plate for storing said jack device in a horizontal position, said position-locking pin further being attached to said stowaway bracket by means of a retaining chain to prevent losing said pin; and said quick release safety-locking pin inserted through said through-holes in said outer cylindrical housing and a desired hole in said solid cylindrical lift rod for securing said jack device for use or storage;

an air compressor mounted in the engine compartment of said motor vehicle, said compressor driven by belt means off of said motor vehicle's engine;

an air tank for storing compressed air, said tank being connected to the output of said air compressor by high-pressure hose means;

each of said jack devices being connected to the output of said air tank by individual high-pressure hoses;

said electrical switch on each said jack devices being wired to said motor vehicle's battery; and a system activation switch wired from said motor vehicle's battery to each said jack devices switch, said system activation switch mounted internal to said motor vehicle.

7. The system of claim 6, wherein one of four said pneumatic jack devices is mounted to said motor vehicle's frame adjacent each wheel for lifting a tire off the ground.

8. The system of claim 6, wherein up to four tires can be lifted off the ground simultaneous for rotating said tires.

9. The system of claim 6, wherein said auxiliary air hose is connected to said quick release air outlet fitting of said pneumatic chamber for airing up a tire.

10. The system of claim 6, wherein said auxiliary air hose is connected to an air impact wrench for removing and tightening lug nuts holding said tire.

11. The system of claim 6, wherein an adjustable pressure regulator is connected to said air outlet fitting, said regulator having a quick release fitting for an auxiliary hose for use in low pressure applications.

12. The system of claim 11, wherein said pressure regulator is equipped with a pressure gauge for use in adjusting to a desired pressure.

13. The system of claim 6, wherein said ground support plate has a non-skid bottom surface for contacting the ground.

14. A quick and safe method of raising a motor vehicle tire off the ground for changing a flat or rotating the tires, comprising the steps of:

providing a pneumatic jacklift system mounted to a lower frame of said motor vehicle, said pneumatic jacklift system further comprising:

two or more pneumatic jack devices mounted to the lower frame of said motor vehicle, each of said jack devices further comprising:

an upper cylindrical high-pressure pneumatic chamber, said chamber having a high pressure air inlet for attaching an external air hose, said pneumatic chamber further having an electrically operated solenoid valve means for operating said jack device, said pneumatic chamber still further having a quick release air outlet fitting for attaching an auxiliary air hose;

an outer cylindrical high-pressure housing extending downward from the bottom end of said pneumatic chamber, said outer housing having aligned through-holes on each side near the bottom of said housing for accepting a quick release safety-locking pin;

a solid cylindrical lift rod slidably mounted inside said outer cylindrical housing, an interface between said outer cylindrical housing and said solid cylindrical lift rod being comprised of a high-pressure sealing means, said solid cylindrical lift rod having a series of equally spaced through-holes for accepting said quick release safety-locking pin;

a momentary electrical switch for applying and releasing air pressure to said solenoid valve for raising said jack devices;

a solid support plate mounted to the bottom of said solid cylindrical lift rod for contacting the ground, said support plate further having a horizontal storage securing tab with a through-hole extending from one side for accepting a quick release position-locking pin;

a C-shaped chassis mounting bracket mounted to the top end of said upper cylindrical pneumatic chamber by rotative attachment means, said bracket allowing said pneumatic jack device to be rotated at least 90-degrees to a near horizontal position for storage, said bracket having a through-hole for accepting a position-locking pin, said bracket further having at least four mounting holes in the top surface for mounting each of said jack devices to a motor vehicle frame;

a horizontal stowaway bracket for storing said jack device in an out of the way horizontal position, said stowaway bracket having a through-hole for accepting said position-locking pin, said stowaway bracket further having mounting holes in the top surface for mounting to said motor vehicle frame;

said position-locking pin inserted through said through-hole in said C-shaped chassis mounting bracket to secure each of said jack devices in a downward operational position for lifting said motor vehicle, said position-locking pin further being inserted through said through-hole in said horizontal stowaway bracket and said storage securing tab on said solid support plate for storing each of said jack devices in a horizontal position, said position-locking pin further being attached to said stowaway bracket by means of a retaining chain to prevent losing said pin; and said quick release safety-locking pin inserted through said through-holes in said outer cylindrical housing and a desired hole in said solid cylindrical lift rod for securing each of said jack devices for use or storage;

an air compressor mounted in the engine compartment of said motor vehicle, said compressor driven by belt means off of said motor vehicle's engine;

an air tank for storing compressed air, said tank being connected to the output of said air compressor by high-pressure hose means;

each of said jack devices being connected to the output of said air tank by individual high-pressure hoses;

said electrical switch on each of said jack devices being wired to said motor vehicle's battery; and a system activation switch wired from said motor vehicle's battery to each of said jack devices switch, said system activation switch mounted internal to said motor vehicle;

activating said system using said system activation switch mounted internal to said motor vehicle to turn ON said air compressor;

removing said quick release position-locking pin from said stowaway bracket of one or more said pneumatic jacklift devices, allowing each of said jacklift devices to swing downward in a vertical operational position above the ground;

reinserting said quick release position-locking pin into said through-holes in said C-shaped chassis mounting bracket, thereby securing each of said jacklift devices in an operational position;

removing said quick release safety-locking pin from said through-hole in said outer cylindrical housing, thereby releasing said solid cylindrical lift rod;

holding said electrical switch on each of said jacklift devices in the extend position until the tire is lifted off the ground by a desired height;

continuing lifting said tire until said through-hole in said outer cylindrical housing aligns with the next through-hole in said solid cylindrical lift rod;

inserting said quick release safety locking-pin into said through-holes in said outer cylindrical housing and said through-hole in said solid cylindrical lift rod, thereby preventing the possibility of said motor vehicle falling in the event of air pressure loss;

holding said electrical switch on each of said jacklift devices in the retract position momentarily to slightly lower said jacklift on-to said quick release safety-locking pin, thereby securing said motor vehicle;

changing said tire;

holding said electrical switch on each of said jacklift devices in the extend position momentarily to slightly raise said jacklift up off said quick release safety-locking pin;

removing said quick release safety-locking pin;

holding said electrical switch on each of said jacklift devices in the retract position, thereby releasing said compressed air allowing said motor vehicle to lower to the ground;

pushing said solid cylindrical lift rod up into said cylindrical outer housing;

inserting said quick release safety-locking pin through said through-holes in said outer cylindrical housing and the bottom through-hole in said solid cylindrical lift rod;

removing said quick release position-locking pin from said C-shaped chassis mounting bracket;

swinging each of said jacklift devices upward into a horizontal position;

inserting said quick release position-pin through said stowaway bracket and said storage securing tab on said ground support plate, thereby securing said jacklift device in an out of the way position; and turning OFF said jacklift system switch, thereby dumping any remaining compressed air from said air tank.

15. The method of claim 14, wherein said auxiliary air hose is connected to said quick release air outlet fining of said pneumatic chamber for airing up a tire.

16. The method of claim 14, wherein said auxiliary air hose is connected to an air impact wrench for removing and tightening lug nuts holding said tire.

17. The method of claim 14, wherein one of four said pneumatic jack devices is mounted to said motor vehicle's frame adjacent each wheel for lifting a tire off the ground.

18. The method of claim 14, wherein up to four tires can be lifted off the ground simultaneous for rotating said tires.

* * * * *